(No Model.)

C. HALSTEAD.
COVERING FOR ROLLERS.

No. 409,101. Patented Aug. 13, 1889.

E { Chipped rawhide, liquid rawhide, venice turpentine, and Glycerine

H—Elastic foundation.

Witnesses
Fred Stoller
Vernon M. Dorsey

Inventor
Charles Halstead,
By C. S. Whitman
Attorney

UNITED STATES PATENT OFFICE.

CHARLES HALSTEAD, OF PROVIDENCE, RHODE ISLAND.

COVERING FOR ROLLERS.

SPECIFICATION forming part of Letters Patent No. 409,101, dated August 13, 1889.

Application filed April 4, 1888. Serial No. 269,571. (No model.)

*To all whom it may concern:*

Be it known that I, CHARLES HALSTEAD, a citizen of the United States, residing at Providence, in the county of Providence and State of Rhode Island, have invented certain new and useful Improvements in Compositions for Coverings for Rollers; and I hereby declare that the following is a full, clear, and exact description of the invention, such as will enable others skilled in the art to which it appertains to make and use the same.

My invention consists in a new and useful composition of matter to be used in the manufacture of wheels, rollers, and pulleys, and in the manufacture of coverings therefor; and it consists of the following ingredients, combined in the following proportions: rawhide, forty parts; Venice turpentine, two parts; glycerine, one part; chipped rawhide, a sufficient quantity to fill the mold.

Figure 1:
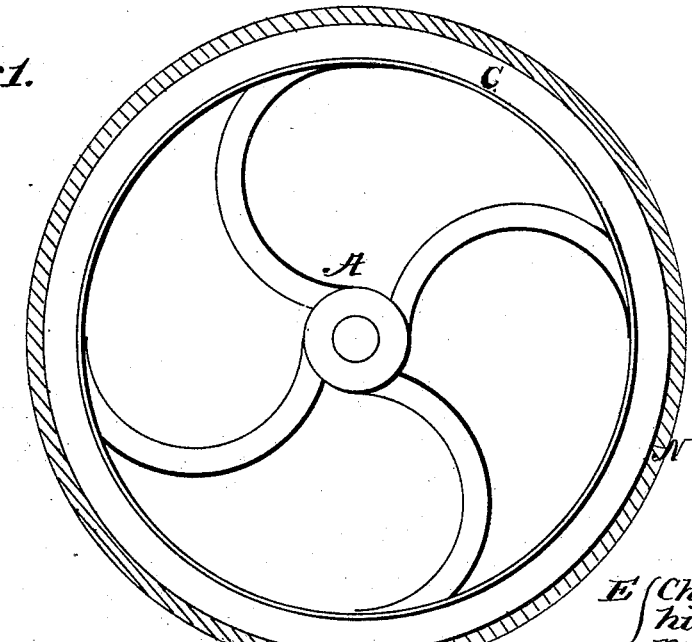
Figure 2:
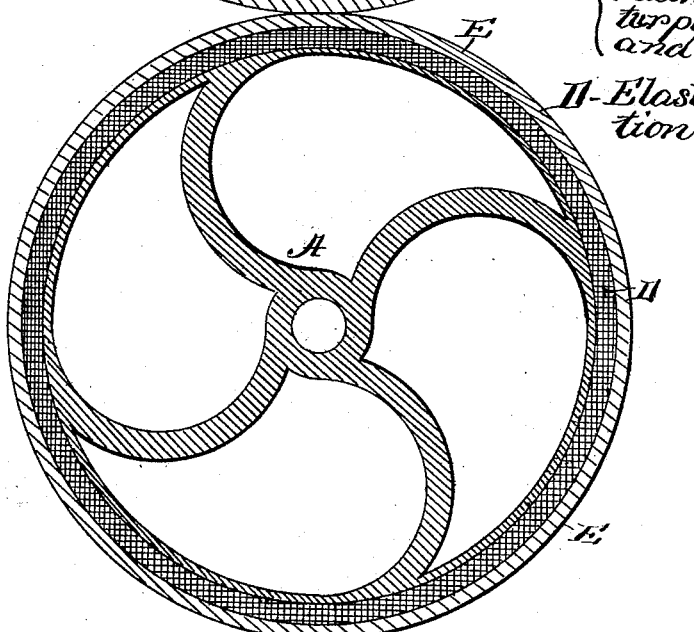
Figure 3:
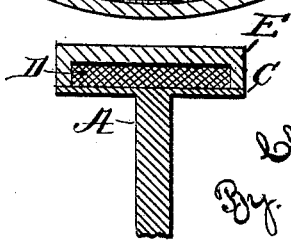

In the accompanying drawings, Figure 1 represents a mold containing a pulley to be covered with the composition which is poured around it within the mold; Fig. 2, a wheel surrounded by an elastic annulus, which is covered by the composition placed about it; and Fig. 3 represents a longitudinal section of Fig. 2.

I first take the rawhide, which has had the hair sweated off, and cut or shave it into fine particles and dry them by submitting them to the action of about 80° or 90° of heat, Fahrenheit. I then place these dried chips or particles into a mold, either around the roller or other article I may wish to cover; or I place the chips in a mold by themselves in case I wish to form the roller, sheave, or pulley entirely of the composition.

To the forty parts of rawhide, which I first boil down into a jelly, filter, and strain, I add the two parts of Venice turpentine and the one (1) part of glycerine, and after having thoroughly mixed them by stirring I pour the still heated liquid produced in this manner over or upon the particles of hide, which are packed within the mold. I then submit the composition with the mold to pressure until it is cold, when the liquid solidifies around the particles of rawhide, after which I remove the roller or other article to a drying-room, where it is allowed to remain for several days.

In the drawings, Fig. 1, A designates the sheave, roller, or pulley; N, the mold or case in which it is placed, and C the receptacle into which the chipped rawhide is placed and the liquid poured.

In some cases the roller, sheave, or pulley is surrounded by some elastic covering, of cloth, rubber, or other springy substance, as shown in Fig. 2, in which D designates the elastic material placed around the rim of the roller A. When the article is finished and ready for use, the cloth or rubber forms an annular elastic foundation for the substance E, which has been placed around it.

Although I have described molds applicable to the construction of rollers, sheaves, and pulleys, it is evident that the composition of matter described may be used in the construction of other articles—as, for instance, loom-pickers.

Having now described my invention, what I claim, and desire to secure by Letters Patent, is—

1. The herein-described composition of matter for covering rollers, which consists of chipped rawhide over which a liquid composed of boiled rawhide and Venice turpentine has been poured, substantially in the proportions set forth.

2. The herein-described composition of matter for covering rollers, which consists of chips of rawhide over which a liquid composed of boiled rawhide, Venice turpentine, and glycerine has been poured, in the proportions specified.

In testimony whereof I have affixed my signature in presence of two witnesses.

CHARLES HALSTEAD.

Witnesses:
WM. F. KING,
EMMA C. GIFFORD.